United States Patent
Pitzen et al.

(10) Patent No.: US 6,811,848 B2
(45) Date of Patent: Nov. 2, 2004

(54) ASSEMBLAGE OF LAMINANTS FOR FORMING A GRAPHIC

(75) Inventors: James F. Pitzen, Maplewood, MN (US); Kristin L. Thunhorst, Stillwater, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 12 days.

(21) Appl. No.: 10/004,724

(22) Filed: Dec. 5, 2001

(65) Prior Publication Data

US 2003/0104153 A1 Jun. 5, 2003

(51) Int. Cl.[7] .............................................. B32B 3/00
(52) U.S. Cl. ...................... 428/40.1; 283/81; 428/42.1; 428/42.2; 428/42.3; 428/43; 428/192; 428/202; 428/203; 428/914
(58) Field of Search ............................. 428/40.1, 42.1, 428/42.2, 42.3, 43, 192, 202, 203, 914; 283/81

(56) References Cited

U.S. PATENT DOCUMENTS

| | | | |
|---|---|---|---|
| 3,315,387 A | * | 4/1967 | Heuser ......................... 40/299 |
| 3,815,263 A | | 6/1974 | Oberwager |
| 4,264,666 A | | 4/1981 | Hix |
| 5,665,446 A | | 9/1997 | Sundet |
| 5,840,407 A | | 11/1998 | Futhey et al. |
| 5,865,928 A | | 2/1999 | Lariviere, Jr. et al. |
| 5,882,774 A | | 3/1999 | Jonza et al. |
| 6,004,421 A | | 12/1999 | Landa |

FOREIGN PATENT DOCUMENTS

| | | |
|---|---|---|
| EP | 0 693 993 B1 | 1/1996 |
| GB | 1 493 103 | 11/1977 |
| WO | WO94/23957 | 10/1994 |

* cited by examiner

*Primary Examiner*—Nasser Ahmad
(74) *Attorney, Agent, or Firm*—William L. Huebsch

(57) ABSTRACT

An assemblage of laminates each including only a portion of a graphic, which graphic portion has a layer of pressure-sensitive adhesive along its rear major surface. The graphic portions in the laminates are adapted to be adhered to a substrate by the layers of adhesive in a predetermined relative orientation to form a graphic having a predetermined shape. Each of the laminates further includes a separate polymeric cover sheet having opposite outer and inner major surfaces and overlaying the graphic portion, and a layer of removable pressure-sensitive adhesive having opposite front and rear major surfaces, which layer of removable pressure-sensitive adhesive is coextensive with and has its rear surface adhered to the inner major surface of the cover sheet and has its front surface adhered to the front surface of the graphic portion. The cover sheets in the laminates have irregular visually distinctive mating edges shaped for edge-to-edge engagement only when the graphic portions in the laminates are in the predetermined relative orientation.

15 Claims, 5 Drawing Sheets

ASSEMBLAGE OF LAMINANTS FOR FORMING A GRAPHIC

FIELD OF THE INVENTION

The invention is concerned with the application of designs and other graphics to smooth substrates and is particularly concerned with forming and positioning graphics on glass panes, which graphics appear to have been etched, sand-blasted, or cut into the glass.

DESCRIPTION OF THE RELATED ART

Minnesota Mining and Manufacturing Company, St. Paul, Minn. manufactures vinyl films which can be applied to glass panes to form graphics that appear to have been etched or sand-blasted into the glass at a fraction of the cost of actual etching or sand blasting. These vinyl films, typically plasticized poly(vinyl chloride), are marketed as Scotchcal (trade mark) Series 7725 special effects films. Among these, Scotchcal (trade mark) 7725-314 Dusted Crystal Film gives the appearance of etched glass, and Scotchcal (trade mark) 7725-324 Frosted Crystal Film gives the decorative appearance of sand-blasted glass. Each of these special effects vinyl films bears a layer of aggressive pressure-sensitive adhesive and a low-adhesion carrier web that protects the adhesive. The pressure-sensitive adhesive is selected to form strong bonds to glass.

U.S. Pat. No. 5,665,446, the content whereof is hereby incorporated herein by reference, describes a laminate that makes it easy to apply graphics (i.e., decorations and/or messages) made from such special effects vinyl films with precision, such that both professional installers and homeowners can use that laminate to apply graphics that give an etched or sand-blasted appearance to glass panes. Generally, that laminate includes (1) a transparent polymeric cover sheet having opposite outer and inner major surfaces, (2) a layer of removable pressure-sensitive adhesive having opposite front and rear major surfaces that is coextensive with and has its rear surface adhered to the inner major surface of the cover sheet, the transparent polymeric cover sheet and the layer of removable pressure sensitive adhesive having spaced vents between the outer and front surfaces over the entire area of each of the outer and front surfaces, (3) polymeric film graphics having opposite major surfaces with one of the major surfaces of the film graphics being adhered to the front surface of the layer of removable pressure sensitive adhesive, and a second layer of pressure-sensitive adhesive coextensive with each of the graphics adhered to the major surfaces of the graphics opposite the layer of removable pressure sensitive adhesive.

A flexible low-adhesion carrier web which is coextensive with the cover sheet can protect the aggressive pressure-sensitive adhesive and areas of the removable pressure-sensitive adhesive that otherwise would be exposed.

The decorative graphics-forming polymeric film can be a vinyl film which gives the appearance of etched or sand-blasted glass like the Scotchcal (trade mark) Series 7725 special effects films. Graphics are cut into the decorative polymeric film and its aggressive pressure-sensitive adhesive without cutting through the low-adhesion carrier web, and the adhesive-bearing weed is peeled from the flexible carrier web and discarded. Preferably the peeling step promptly follows the cutting step, before the aggressive-pressure-sensitive adhesive can flow back across the cuts. Then a transparent cover sheet coated with removable adhesive and vented through the cover sheet and adhesive is adhered by the removable adhesive to the graphics as well as to exposed areas of the low-adhesion carrier web to complete the novel laminate.

The removable pressure-sensitive adhesive is selected to form a bond to the graphics that both (a) permits the low-adhesion carrier web to be peeled away without disrupting that bond and (b) permits the vented removable adhesive coated cover sheet to be peeled cleanly from the graphics without disrupting the adhesive bond between the graphics and a glass pane or other substrate to which the graphics are being applied.

After removing the low-adhesion carrier web to expose the underlying adhesive areas and wetting the exposed adhesive areas with a detergent and water solution (which is a wetting liquid that can lubricate the adhesives and can evaporate), the wet adhesive areas can be pressed against a wet substrate. Because the cover sheet and the layer of removable adhesive thereon are transparent or translucent, the user is able to see both the graphics and the underlying substrate and is able to reposition the wet laminate and its graphics with precision for a short time (i.e., 1 to 5 minutes) on the wet substrate. A squeegee can be used to eliminate any air and wetting liquid from between the graphics and the substrate, and the solution will evaporate through the vents in the layer of removable adhesive and the cover sheet so that the graphics will become bonded to the substrate. The polymeric cover sheet and the layer of adhesive adhered thereto can be almost opaque, requiring just enough transparency to enable the user to see margins of the graphics while the laminate is wet with the solution. After the graphics have become bonded to the substrate, the cover sheet is peeled off with its removable adhesive, thus exposing the graphics.

While the laminate described in U.S. Pat. No. 5,665,446 makes it easy to apply graphics, such laminates become more difficult to manufacture, transport, and handle easily during application of the graphic when they are large, such as, for example, a laminate including an elongate graphic (e.g., over 6 feet or 1.8 meters long) that might be used to decorate a sidelight window in a home.

DISCLOSURE OF THE INVENTION

The present invention allows large graphics, such as elongate graphics over 6 feet or 1.8 meters long to be conveniently manufactured, transported, and handled during application, while still facilitating easy and accurate installation of such graphics by either professional or non-professional installers (e.g., homeowners)

According to the present invention there is provided an assemblage of laminates each of which laminates can be generally of the type described in U.S. Pat. No. 5,665,446, or can have alternate structures of types described below. Each laminate includes only a portion of a graphic, which graphic portion has a layer of pressure-sensitive adhesive along its rear major surface. The graphic portions in the laminates are adapted to be adhered to a substrate by the layers of adhesive in a predetermined relative orientation to form a graphic having a predetermined shape. Each of the laminates further includes a layer of pre-mask overlaying the graphic portion, which layer of pre-mask comprises a cover sheet having opposite outer and inner major surfaces, and a layer of removable pressure-sensitive adhesive having opposite front and rear major surfaces, which layer of removable pressure-sensitive adhesive is coextensive with and has its rear surface firmly adhered to the inner major surface of the cover sheet and has its front surface removably adhered to the front surface of the graphic portion. The cover sheets in the laminates have irregular visually distinctive mating edges shaped for edge-to-edge engagement only when the graphic portions in the laminates are in the predetermined relative orientation. The irregular visually distinctive mating edges of the cover sheets are precisely shaped to provide accurate edge-to-edge engagement of the cover sheets, and have visually distinctive shapes that allow easy identification of the mating edges and how the mating edges are to be positioned in engagement with each other to cause the proper predetermined relative orientation of the graphic portions when they are applied to a substrate.

The cover sheets should have portions along their mating edges that project past the adjacent peripheral edges of the graphic portions, which projecting portions of the cover sheet provide protection for the edges of the graphic portions before they are applied to a substrate, and provide a desired spacing between adjacent graphic portions. Such projecting portions of the cover sheets also help to hold down the adjacent peripheral edge portions of the graphic portions during the installation process to promote good adhesion of those edge portions to the substrate.

The graphic portions in the laminates can be individually applied to a substrate by the method described above with reference to U.S. Pat. No. 5,665,446, which generally includes wetting the exposed adhesive areas on the graphic portion and cover sheet and the substrate with a wetting liquid that can lubricate the adhesives (i.e., the graphic portion and cover sheet can be moved along the substrate for a short time after application) and can evaporate, such as a detergent and water solution, pressing those wet adhesive areas against a wet substrate and using a squeegee to eliminate any air and most of the wetting liquid from between the graphic portion and the substrate, and then, after the laminates and substrate have dried and the graphic portions have become bonded to the substrate, peeling off the cover sheet and the removable adhesive to expose the graphic portions. The proper relative location of the graphic portions in the laminates so that they will form the graphic having the predetermined shape is easily obtained by placing the visually distinctive irregular mating edges of the cover sheets in edge-to-edge engagement during such application. All of the laminates can be applied to the substrate at one time, or, the laminates can be applied serially at different times.

The separate laminates included in the assemblage are each significantly smaller than the graphic that they can be used to make. Thus, separate laminates that can be used to make a large graphic can be individually made using manufacturing equipment (e.g., a rotary die cutter, plotter cutter, flatbed cutter, tape applicator, etc.) that is often more readily available, cost effective, and efficient than equipment that would be needed to make the same large graphic in one laminate. The smaller size of the separate laminates makes them easier to store and transport before they are used. Also, the separate laminates are easier to handle while the graphic portions within them are applied to a substrate to form a large graphic than would be a single laminate including that entire large graphic.

One embodiment of the assemblage described herein that is useful to apply an elongate graphic includes four laminates, each including a graphic portion adapted to be adhered to a substrate in a predetermined relative orientation to form the graphic having the predetermined shape. The four laminates include a first pair of essentially identical laminates including central graphic portions having first and second ends and adapted to be adhered to the substrate with their first ends adjacent at the center of the graphic, together with a second pair of essentially identical laminates including end graphic portions having first and second ends adapted to be adhered to the substrate at the opposite ends of the central graphic portions with the first ends of the end graphic portions adjacent to the second ends of the central graphic portions. The cover sheets of the laminates including the pair of central graphic portions are essentially identical, have visually distinctive first edges adjacent the first ends of the central graphic portions that will only engage edge-to-edge when the graphic portions in the first pair of laminates are in the predetermined relative orientation, and have opposite irregular visually distinctive second edges adjacent the second ends of the central graphic portions; and the cover sheets of the laminates including the pair of end graphic portions are also essentially identical, have irregular visually distinctive first edges adjacent the first ends of the end graphic portions that will only engage edge-to-edge with the second edges of either of the cover sheets adhered to the pair of central graphic portions when the graphic portions in the first and second pair of laminates are in the predetermined relative orientation. The irregular visually distinctive first edges of the cover sheets of the laminates including the pair of central graphic portions are different than and easily visually distinguishable from the irregular visually distinctive second edges of the cover sheets of the laminates including the pair of central graphic portions and the irregular visually distinctive first edges of the cover sheets of the laminates including the pair of end graphic portions. Thus, a person applying the graphic portion can easily and almost instinctively properly align the four laminates as the graphic portions are transferred to a substrate.

Another embodiment of the assemblage described herein, which is also useful to apply elongate graphics, includes at least three laminates including graphic portions adapted to be adhered to a substrate in a predetermined relative orientation to form the graphic having the predetermined shape, which three graphic portions are essentially identical, have first and second ends, and are adapted to be adhered to the substrate in any order with the first ends of two of the graphic portions positioned adjacent the second ends of two of the graphic portions. The cover sheets of the laminates including the identical graphic portions are also essentially identical, each having an irregular visually distinctive first edge adjacent the first end of the graphic portion and having an opposite irregular visually distinctive second edge adjacent the second end of the graphic portion adapted for edge-to-edge engagement with the irregular visually distinctive first edges of either of the other two cover sheets to afford placing the graphic portions in the predetermined relative orientation.

The graphic to be applied by the assemblage can be elongate and the separate graphic portions can have parts extending past each other longitudinally of the graphic when the graphic portions are in their predetermined relative orientation.

The word "graphic" as used herein includes any types of decorations and/or messages formed on a surface including, but not limited to, by members of special shapes (e.g., members die cut from decorative film) adhered to the surface, or by lengths of decorative tape having parallel longitudinal edges adhered to the surface in a decorative pattern.

BRIEF DESCRIPTION OF THE DRAWING

The present invention will be further described with reference to the accompanying drawing wherein like reference numerals refer to like parts in the several views, and wherein.

DETAILED DESCRIPTION OF THE INVENTION

Figure 1:
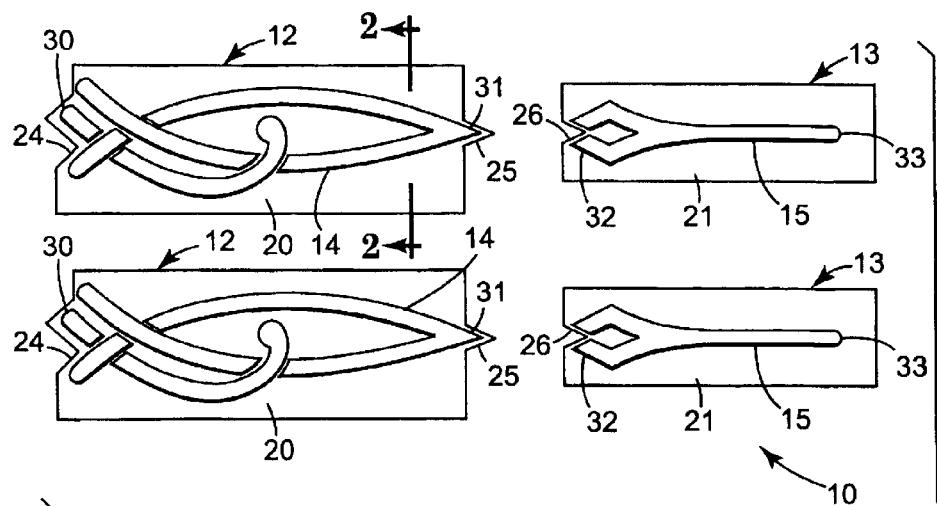
FIG. 1 is a plan view of a first embodiment of an assemblage of laminates according to the present invention that can be used to apply a graphic to a substrate.
Figure 3:
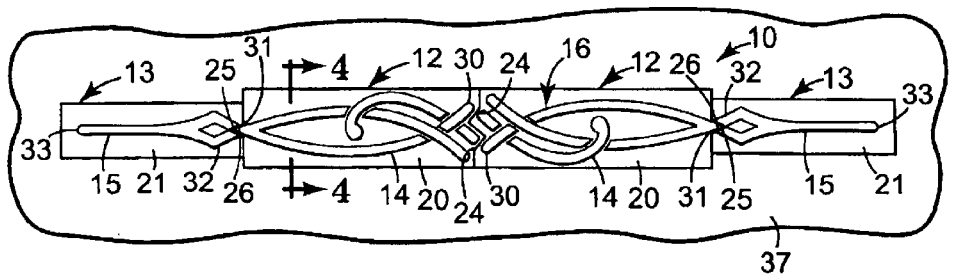
FIG. 3 is a plan view of the assemblage of laminates of FIG. 1 after carrier webs included in the laminates have been removed and graphic portions and overlaying pre-mask layers have been applied to a substrate to form the graphic.
Figure 4:
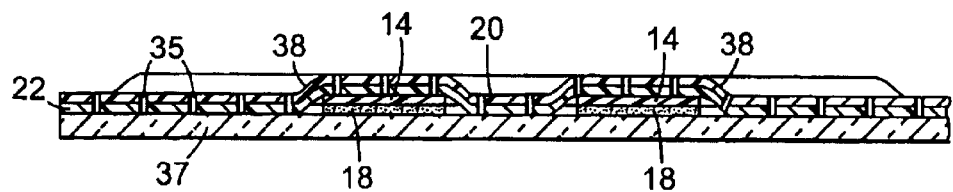
FIG. 4 is an enlarged sectional view taken approximately along line 4—4 of FIG. 3.
Figure 5:
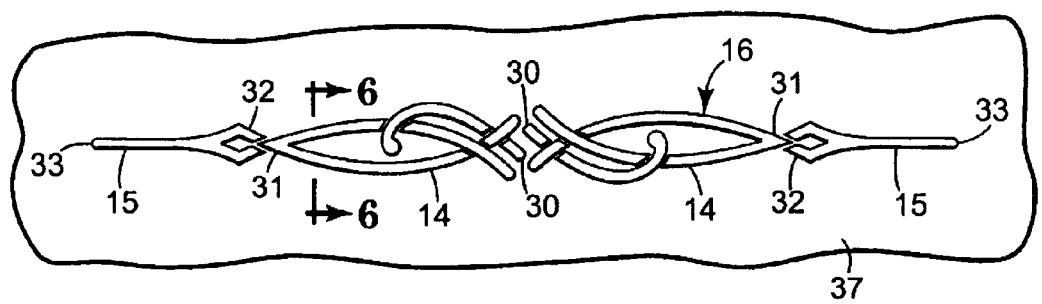
FIG. 5 is a plan view of graphic portions in the assemblage of laminates of FIG. 1 after they have been applied to the substrate to form the graphic as illustrated in FIG. 3 and the overlaying pre-mask layers have been removed.
Figure 6:
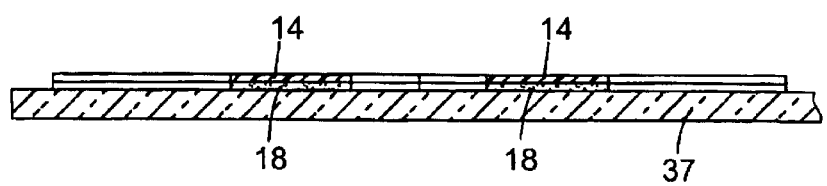
FIG. 6 is an enlarged sectional view taken approximately along line 6—6 of FIG. 5.

Referring now to FIG. 1 of the drawing, there is illustrated a first embodiment of an assemblage of laminates according to the present invention generally designated by the reference numeral 10. As illustrated, the assemblage 10 includes two pairs of essentially identical laminates (i.e., a first pair being the two laminates identified by the reference numeral 12, and a second pair being the two laminates identified by the reference numeral 13). Each of the laminates includes a graphic portion (i.e., the graphic portions in the first pair of laminates 12 being identified by the reference numeral 14, and the graphic portions in the second pair of laminates 13 being identified by the reference numeral 15). The graphic portions 14 and 15 in the laminates 12 and 13 are adapted to be adhered to a substrate in a predetermined relative orientation by a method later to be described to form a graphic 16 having a predetermined shape that is illustrated in FIGS. 3 and 5. The graphic portions 14 and 15 are illustrated in solid black to help distinguish them from the other parts of the laminates 12 and 13, and while the graphic portions can be dark as illustrated, they are often very light colored and/or semi-transparent as will be apparent from the list of materials from which they can be made that is provided below.

Figure 2:
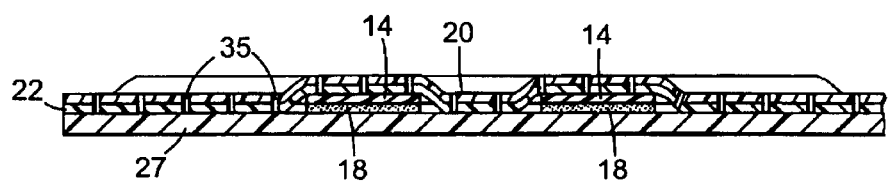
FIG. 2 is an enlarged sectional view taken approximately along line 2—2 of FIG. 1.

While the shapes of the graphic portions 14 and 15 differ, as do the peripheral shapes of the laminates 12 and 13, they each have essentially the same laminar structure that is illustrated by the sectional view in FIG. 2. The graphic portion 14 or 15 in each of the laminates 12 or 13 has front and rear major surfaces and a layer 18 of aggressive pressure-sensitive adhesive along its rear surface by which the graphic portion 14 or 15 can be adhered to a substrate. Each of the laminates 12 and 13 includes a separate layer of pre-mask material including a transparent polymeric cover sheet (i.e., the cover sheets in the first pair of laminates 12 being identified by the reference numeral 20, and the cover sheets in the second pair of laminates 13 being identified by the reference numeral 21) having opposite outer and inner major surfaces and overlaying the graphic portion 14 or 15, and a layer 22 of removable pressure-sensitive adhesive having opposite front and rear major surfaces, which layer 22 of removable pressure-sensitive adhesive is coextensive with and has its rear surface firmly adhered to the inner major surface of the cover sheet 20 or 21 and has its front surface releasably adhered to the front surface of the graphic portion 14 or 15. The cover sheets 20 and 21 have irregular visually distinctive mating edges 24, 25, and 26 shaped for edge-to-edge engagement only when the graphic portions 14 and 15 are in the predetermined relative orientation to form the graphic 16 having the predetermined shape that is illustrated in FIGS. 3 and 5. The irregular visually distinctive mating edges 24, 25, and 26 of the cover sheets 20 and 21 are precisely shaped to provide accurate edge-to-edge engagement of the cover sheets 20 and 21, and have visually distinctive shapes that allow easy identification of the mating edges 24, 25, and 26 and how the mating edges 24, 25, and 26 are to be positioned in engagement with each other to cause the proper predetermined relative orientation of the graphic portions 14 and 15 when they are applied to a substrate.

A flexible low-adhesion carrier web 27 for each laminate 12 and 13 that is coextensive with its cover sheet 20 or 21 and layer 22 of removable adhesive protects and is releasably adhered to the layer 18 of aggressive pressure-sensitive adhesive and the areas of the layer 22 of removable pressure-sensitive adhesive not adhered to the graphic portion 14 or 15.

The first pair of graphic portions 14 have first and second opposite ends 30 and 31 respectively and are adapted to be adhered to the substrate with their first ends 30 adjacent at the center of the graphic 16 as can be seen in FIGS. 3 and 5. The second pair of graphic portions 15 have first and second ends 32 and 33 respectively and are adapted to be adhered to the substrate at the opposite ends of the central graphic portions 14 with the first ends 32 of the end graphic portions 15 adjacent the second ends 31 of the central graphic portions 14. The cover sheets 20 of the laminates 12 including the pair of central graphic portions 14 that are essentially identical have the first irregular visually distinctive mating edges 24 that are adjacent the first ends 30 of the central graphic portions 14, which first irregular mating edges 24 are adapted for edge to edge engagement with each other. The cover sheets 20 of the laminates 12 including the pair of central graphic portions 14 also have the second irregular visually distinctive mating edges 25 at their ends opposite the edges 24, which second irregular mating edges 25 are adjacent the second ends 31 of the central graphic portions 14. The cover sheets 21 of the laminates 13 including the pair of essentially identical end graphic portions 15 have the first irregular mating edges 26 adjacent the first ends 32 of the end graphic portions 15. Those first irregular mating edges 26 are adapted for edge to edge engagement with the second irregular mating edges 25 of either of the cover sheets 20 adhered to the pair of central graphic portions 15. As can be seen in the drawing, the first irregular edges 24 of the cover sheets 20 of the laminates 12 including the pair of central graphic portions 14 (which define both a V-shaped projection and a V-shaped socket) are quite different than and are easily visually distinguishable from the second irregular mating edges 25 of the cover sheets 20 of the laminates 12 including the pair of central graphic portions 14 (which irregular mating edges 25 are along one relatively large V-shaped projection) and the first irregular mating edges 26 of the cover sheets 21 of the laminates 13 including the pair of end graphic portions 15 (which irregular mating edges 26 define one relatively large V-shaped socket). Thus, a person applying the graphic portions 14 and 15 to a substrate can easily and almost instinctively properly align and engage the irregular mating edges 24 of the two cover sheets 20, and the irregular mating edges 25 of the cover sheets 20 with the irregular mating edges 26 of the cover sheet 21 so that the graphic portions 14 and 15 will be in their proper predetermined orientation when they are transferred to a substrate to form the graphic 16; and since the laminates 12 are interchangeable with each other as are the laminates 13, the probability is quite high that a person using the laminates 12 and 13 to apply the graphic portions 14 and 15 will properly align them as seen in FIG. 3 to properly form the graphic 16.

As can be seen in FIGS. 3 and 5, the ends 30 of the graphic portions 14 and the ends 31 and 32 of the graphic portions 14 and 15 respectively extend past each other longitudinally of the graphic 16 when those graphic portions 14 and 15 are in the predetermined relative orientation required to form the graphic 16. The irregular mating edges 24, 25 and 26 on the cover sheets 20 and 21 extend around those ends 30, 31, and 32, and are spaced away from the adjacent edges of those ends 30, 31, and 32 of the graphic portions 14 and 15 a minimum distance so that the edge portions of the cover sheets 20 and 21 between their mating edges 24, 25, and 26 and the adjacent ends 30, 31 and 32 of the graphic portions 14 and 15 will provide protection for the graphic portions before they are applied to a substrate, while establishing, upon proper edge-to-edge engagement of the laminates 12 and 13, a desired spacing and orientation between those ends 30, 31 and 32 in the graphic 16 after it is applied to a substrate. That minimum distance between the mating edges 24, 25 and 26 on the cover sheets 20 and 21 and the adjacent peripheral edges of those ends 30, 31, and 32 of the graphic portions 14 and 15 should be at least 0.05 inch or 0.13 cm, should preferably be at least 0.1 inch or 0.25 cm, and should even more preferably be at least 0.25 inch or 0.64 cm.

As illustrated, the layers of pre-mask material including the cover sheets 20 and 21 and the layers 22 of removable adhesive that adhere them to the front surfaces of the graphic portions 14 and 15 can be vented, (e.g., have vents 35 through the cover sheets 20 and 21 and the layers 22 of removable adhesive that are generally circular or oval perforations in a patterned grid) as is taught in U.S. Pat. No. 5,665,446. Alternatively, those layers of pre-mask material, rather than being perforated, could be selected to allow passage of moisture to facilitate drying of a substrate to which the graphic portions 14 and 15 are adhered. Suitable materials for the cover sheets 20 and 21 in such layers of pre-mask material (which may not need to be transparent or translucent for some applications) could be polymers, paper, cellulose, non-woven fiber or other woven material; and the layers 22 of removable adhesive could be formed from randomly laid adhesive strands between which strands spaces are left that permit the passage of moisture.

To apply the graphic portions 14 and 15 in the assemblage 10 to a substrate 37 such as a layer of glass shown in FIGS. 3 through 6, the carrier webs 27 on the laminates 12 and 13 are peeled off and discarded, the adhesive face of the laminates 12 and 13 and the substrate 37 are wet (typically by spraying) with a wetting liquid that can lubricate the adhesives in the layers 18 and 22 and can evaporate, such as a detergent and water solution (plain water can also be used, but is less effective). The adhesive faces of the laminates 12 and 13 are then placed against the wet substrate 37 (see FIG. 3). The laminates 12 and 13 can be moved along the wet substrate to accurately engage the irregular mating edges 24 of the cover sheets 20 with each other and to accurately engage the irregular mating edges 26 of the cover sheets 21 with the irregular mating edges 25 of the cover sheets 20 so that the graphic portions 14 and 15 are in the predetermined relative orientation to form the graphic 16 illustrated in FIGS. 3 and 5. A squeegee such as a piece of plastic can be used to push wetting liquid and air bubbles from beneath each of the graphic portions 14 and 15. Soon thereafter, the layers 22 of removable adhesive in the laminates 12 and 13 may (depending on the removable adhesive used) attain a cloudy appearance. If a removable adhesive is used that turns cloudy when made wet, clear borders appear at the edges 38 of the graphic portions 14 and 15 after the solution is allowed to evaporate at room temperature. The appearance of those borders indicates that the transparent cover sheets 20 and 21 and layers 22 of removable adhesive can be peeled away without disturbing the graphic portions 14 and 15, leaving the graphic portions 14 and 15 on the substrate 37 in the predetermined relative orientation to form the graphic 16 as is illustrated in FIG. 5.

As an example, in the laminates 12 and 13 forming the assemblage 10 according to the present invention:

1) the transparent polymeric cover sheets 20 and 21 are of a polymeric film (e.g., polyolefin) from 0.5 to 6 mils (12.5 to 150 mm) in thickness, and, if it is vented, its vents are essentially circular or oval perforations of uniform size ranging from 0.015 to 0.2 inch (0.4 to 5 mm) in diameter and are separated by uniform lands of from 0.04 to 0.4 inch (1 to 10 ram) between adjacent perforations;

2) the removable pressure-sensitive adhesive in the layer 22 is generally transparent (especially when applied at low coating weights), and can be based on hollow tacky microspheres as disclosed in U.S. Pat. No. 5,045,569 (Delgado) or solid tacky microspheres as disclosed in U.S. Pat. No. 3,691,140 (Silver), and has a coating weight of from 10 to 75 g/m2, preferably toward the low end of this range for economy but not so thin as to be deficient in bonding strength, with the vents in the adhesive (if any) being aligned with and of the same size and number as the vents in the cover sheet 20 or 21. Natural rubber-based and acrylate adhesive systems can also be used;

3) the graphic portions 14 and 15 can be of a special effects vinyl film (e.g., the vinyl film available from Minnesota Mining and Manufacturing Company, St. Paul, Minn., described above) that can give an etched or sandblasted appearance to graphics on a glass panel and is from 0.5 to 4 mils (12.5 to 100 mm) in thickness, preferably toward the thin end of that range to afford a desirably low profile but not so thin as to lack the desired visual effect. Alternatively, the graphic portions 14 and 15 could be made of other decorative films such as the decorative birefringent multiplayer optical film available from Minnesota Mining and Manufacturing Company, St. Paul, Minn., under the trade designation "Radiant Light Film" that is described in U.S. Pat. No. 5,882,774; and 4) the aggressive pressure-sensitive adhesive in the layers 18 has a coating weight of from 10 to 75 g/m2, preferably toward the thin end of that range to afford a low profile but not but not so thin as to be deficient in bonding strength.

The flexible low-adhesion carrier web 27 can be of paper or a polymeric material that protects the adhesives in the layers 18 and 22 and has good dimensional stability so that the graphic portions 14 and 15 do not become distorted. If needed, release agents such as silicone may be used on the carrier web.

When the removable adhesive coated polymeric cover sheet 20 or 21 and decorative polymeric film in the graphic portions 14 and 15 are made from the same polymer, they will have the same thermal expansion characteristics, thus affording good resistance to wrinkling when exposed to adverse environmental conditions during shipment and storage. Each can be of plasticized poly(vinyl chloride) which is inexpensive, reasonably durable, and easy to handle in manufacture. Also useful for both the transparent polymeric cover sheet and the decorative polymeric film in the graphic portions 14 and 15 are polypropylene, polyethylene, polyolefins, copolymers, acetates, and polyesters such as biaxially oriented poly(ethyleneterephthalate) film. Because the latter is quite strong, it would permit the cover sheet to be as thin as about 0.5 mil (12.5 mm).

Figure 7:
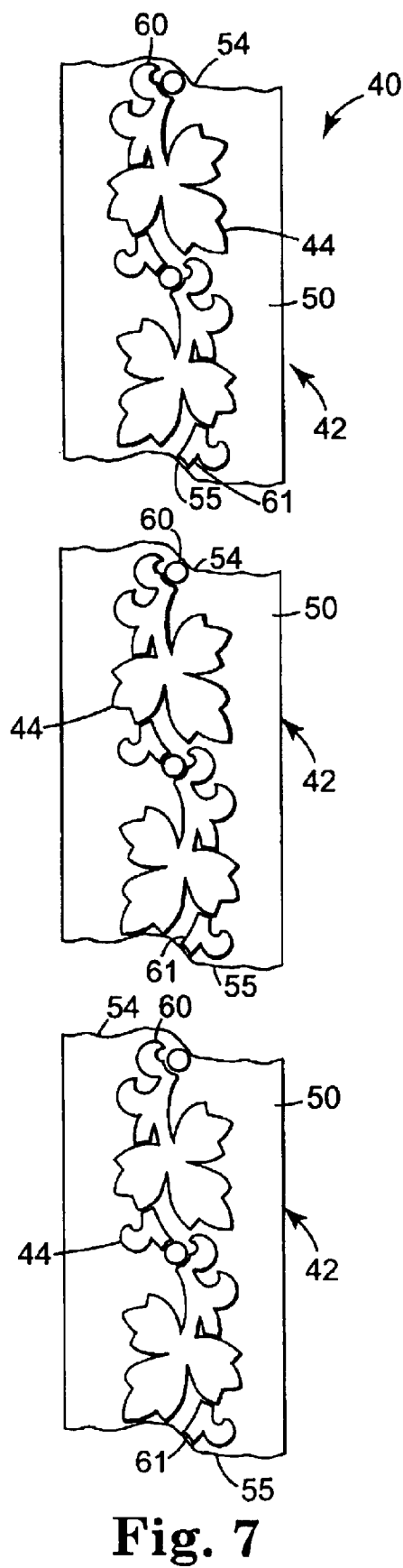
FIG. 7 is a plan view of a second embodiment of an assemblage of laminates according to the present invention that can be used to apply a graphic to a substrate.

Referring now to FIG. 7 of the drawing, there is illustrated a second embodiment of an assemblage of laminates according to the present invention generally designated by the reference numeral 40. As illustrated, the assemblage 40 includes three essentially identical laminates 42. Each of the laminates 42 includes a graphic portion 44 and a separate layer of pre-mask material including a transparent polymeric cover sheet 50. The laminates 42 each have essentially the same laminar structure that was illustrated and described above for the laminates 12 and 13 with reference to FIG. 2, differing only in that the peripheral shapes of the graphic portions 44 and of the cover sheets 50 are different from the peripheral shapes of the graphic portions 14 and 15 and the cover sheets 20 and 21 described above with reference to the assemblage of laminates 10. The graphic portions 44 in the laminates 42 are adapted to be adhered to a substrate in a predetermined relative orientation to form a graphic having a predetermined shape generally by the method described above with reference to the assemblage of laminates 10. The cover sheets 50 included in the laminates 42 each have first and second opposite irregular visually distinctive mating edges 54 and 55 that are near opposite ends 60 and 61 of the graphic portions 60 and 61 respectively. The graphic portions 44 and cover sheets 50 are adapted to be adhered to the substrate in any order with the first irregular mating edges 54 of two of the cover sheets 50 in edge to edge engagement with the second irregular mating edges 55 of two of the cover sheets 50, after which the cover sheets 50 are removed, leaving the graphic portions 44 that form the graphic having the predetermined shape on the substrate. More than three of the laminates 42 could be applied to a substrate in a similar manner to extend the length of the graphic.

Figure 8:
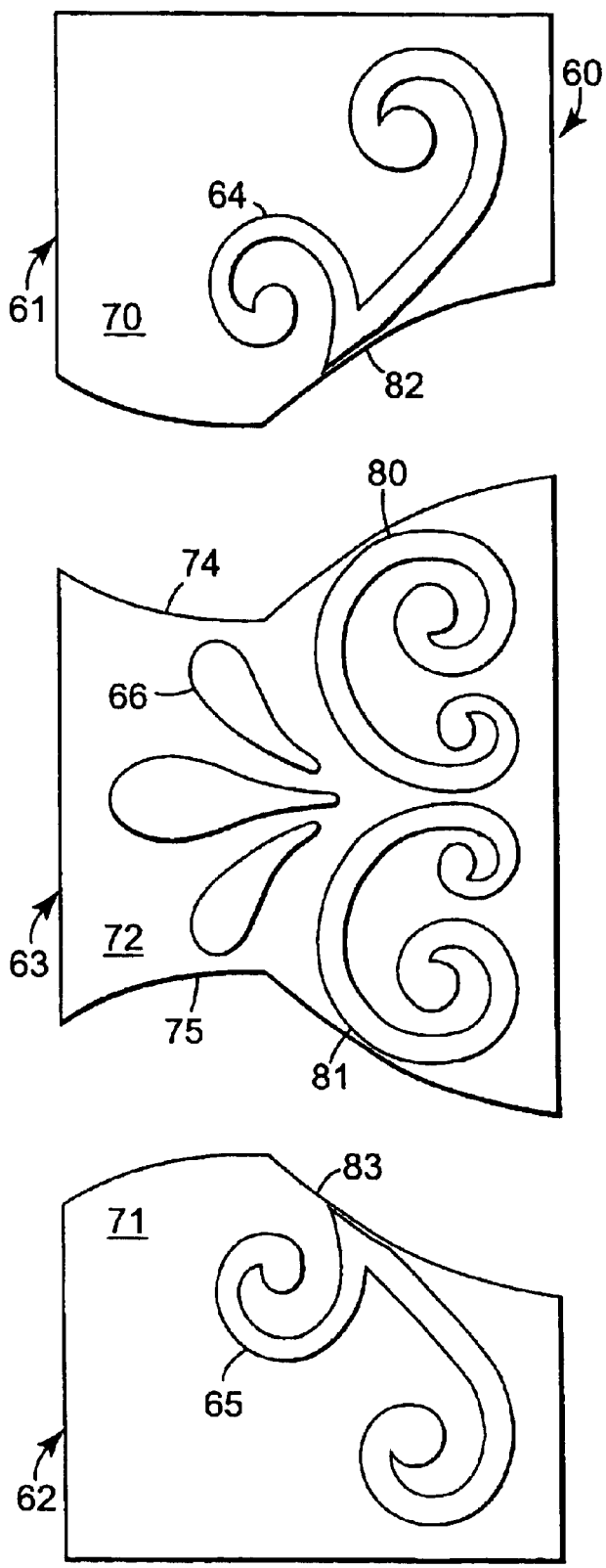
FIG. 8 is a plan view of a third embodiment of an assemblage of laminates according to the present invention that can be used to apply a graphic to a substrate.

Referring now to FIG. 8 of the drawing, there is illustrated a third embodiment of an assemblage of laminates according to the present invention generally designated by the reference numeral 60. As illustrated, the assemblage 60 includes first and second end laminates 61 and 62, and a central laminate 63. Each of the laminates 61, 62 and 63 includes a graphic portion 64, 65 and 66 respectively, and a separate layer of pre-mask material including a transparent polymeric cover sheet 70, 71 and 72 respectively. The laminates 61, 62, and 63 each have essentially the same laminar structure that was illustrated and described above for the laminates 12 and 13 with reference to FIG. 2, differing only in that the peripheral shapes of the graphic portions 64, 65, and 66 and of the cover sheets 70, 71, and 72 are different from the peripheral shapes of the graphic portions 14 and 15 and the cover sheets 20 and 21 described above with reference to the assemblage of laminates 10. The graphic portions 64 and 65 are allochiral or the mirror images of each other, and the graphic portions 64, 65, and 66 in the laminates 61, 62, and 63 are adapted to be adhered to a substrate in a predetermined relative orientation with the graphic portions 64 and 65 on opposite sides of the graphic portion 66 to form a graphic having a predetermined shape generally by the method described above with reference to the assemblage of laminates 10. The cover sheet 72 included in the central laminate 63 has first and second opposite irregular visually distinctive mating edges 74 and 75 that are near opposite ends 80 and 81 of the graphic portion 66; whereas the cover sheet 70 included in the first end laminate 61 has a first irregular visually distinctive mating edge 82 and the cover sheet 71 included in the second end laminate 62 has a first irregular visually distinctive mating edge 83. The graphic portions 64, 65, and 66 are adapted to be adhered to the substrate while the cover sheets 70, 71 and 72 are adhered to them with the first irregular mating edge 82 of the cover sheet 70 in edge-to-edge engagement with the first irregular mating edge 74 of the cover sheet 72 and the first irregular mating edge 83 of the cover sheet 71 in edge-to edge engagement with the second irregular mating edge 75 of the cover sheet 72, after which the cover sheets 70, 71 and 72 are removed, leaving the graphic portions 64, 65, and 66 that form the graphic having the predetermined shape on the substrate.

Figure 9:
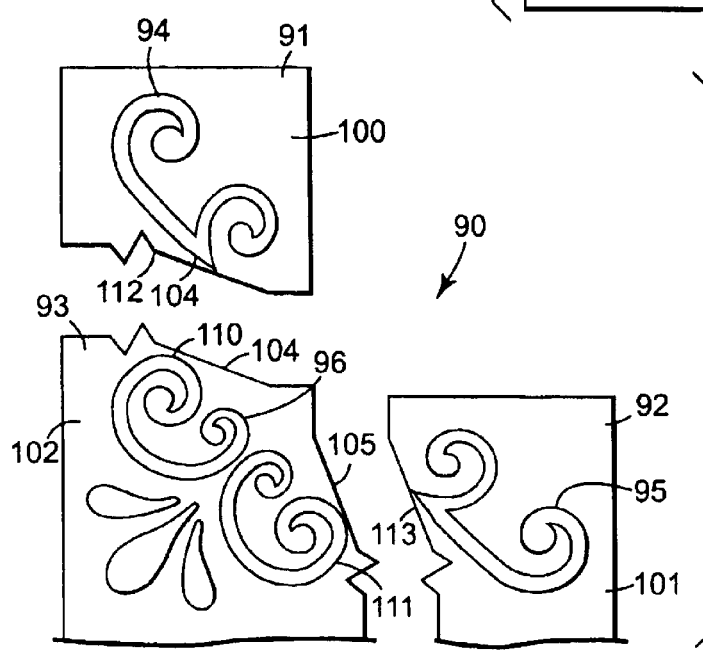
FIG. 9 is a plan view of a fourth embodiment of an assemblage of laminates according to the present invention that can be used to apply a graphic to a substrate.

Referring now to FIG. 9 of the drawing, there is illustrated a third embodiment of an assemblage of laminates according to the present invention generally designated by the reference numeral 90. As illustrated, the assemblage 90 includes first and second end laminates 91 and 92, and a central laminate 93. Each of the laminates 91, 92 and 93 includes a graphic portion 94, 95 and 96 respectively that have the same shapes as the graphic portions 64, 65 and 66 of FIG. 8, and a separate layer of pre-mask material including a transparent polymeric cover sheet 100, 101 and 102 respectively that are shaped differently from the cover sheets 70, 71 and 72 of FIG. 8 so that the graphic to be formed with the assemblage of laminates 90, rather than being elongate as is the graphic to be formed with the assemblage of laminates 60, has the graphic portions 94 and 95 projecting from the graphic portion 96 in two directions generally at a right angle to each other so that it is suitable for placement in a corner of a sheet of glass. The laminates 91, 92, and 93 each have essentially the same laminar structure that was illustrated and described above for the laminates 12 and 13 with reference to FIG. 2, differing only in that the peripheral shapes of the graphic portions 94, 95, and 96 and of the cover sheets 100, 101, and 102 are different from the peripheral shapes of the graphic portions 14 and 15 and the cover sheets 20 and 21 described above with reference to the assemblage of laminates 10. The graphic portions 94 and 95 are allochiral or the mirror images of each other, and the graphic portions 94, 95, and 96 in the laminates 91, 92, and 93 are adapted to be adhered to a substrate in a predetermined relative orientation with the graphic portions 94 and 95 projecting from the graphic portion 96 at generally a right angle to each other to form a graphic having a predetermined shape generally by the method described above with reference to the assemblage of laminates 10. In the graphic formed by the assembly of laminates 90 the graphic portions 94 and 95 will have parts extending past parts of the graphic portion 96 in each of the two directions that the graphic portions 94 and 95 project away from the graphic parts 96. The cover sheet 102 included in the central laminate 93 has first and second opposite irregular visually distinctive mating edges 104 and 105 that are near adjacent sides 110 and 111 of the graphic portion 96; whereas the cover sheet 100 included in the first end laminate 91 has a first irregular visually distinctive mating edge 112 and the cover sheet 101 included in the second end laminate 92 has a first irregular visually distinctive mating edge 113. The graphic portions 94, 95, and 96 are adapted to be adhered to the substrate while the cover sheets 100, 101 and 102 are adhered to them with the first irregular mating edge 112 of the cover sheet 100 in edge-to-edge engagement with the first irregular mating edge 104 of the cover sheet 102 and the first irregular mating edge 113 of the cover sheet 101 in edge-to edge engagement with the second irregular mating edge 105 of the cover sheet 102, after which the cover sheets 100, 101 and 102 are removed, leaving the graphic portions 94, 95, and 96 that form the graphic having the predetermined shape on the substrate.

Figure 10:
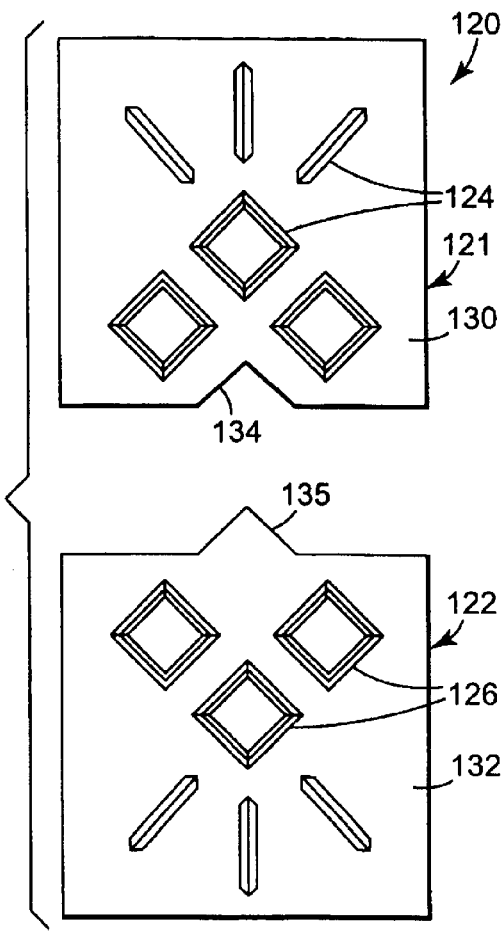
FIG. 10 is a plan view of a fifth embodiment of an assemblage of laminates according to the present invention that can be used to apply a graphic to a substrate.

Referring now to FIG. 10 of the drawing, there is illustrated a fifth embodiment of an assemblage of laminates according to the present invention generally designated by the reference numeral 120. As illustrated, the assemblage 120 includes first and second laminates 121 and 122. Each of the laminates 121 and 122 includes a graphic portion 124 and 126 respectively, and a separate layer of pre-mask material including a transparent polymeric cover sheet 130 and 132 respectively. The laminates 121 and 122 each have generally the same laminar structure that was illustrated and described above for the laminates 12 and 13 with reference to FIG. 2, but differ in that the peripheral shapes of the graphic portions 124 and 126 and of the cover sheets 130 and 132 are different from the peripheral shapes of the graphic portions 14 and 15 and the cover sheets 20 and 21 described above with reference to the assemblage of laminates 10, and that instead of the graphic portions 124 and 126 having been die cut to form the graphic portions, the graphic portions 124 and 126 are formed from strips of decorative film with parallel edges such as strips of the special effects vinyl film or the "Radiant Light Film" described above, or from strips of films that have grooves, vapor coating and/or other structures along their outer major surfaces opposite layers of pressure-sensitive adhesive along their other major surfaces so that the strips of decorative film visually simulate decorative glass (e.g., glass with a single bevel, beveled edges as illustrated, or with a central groove along its length (e.g., a V shaped groove), or with a leaded appearance, or with a textured surface), or visually simulate a glass related structure such as brass or lead came (e.g., the strips of optical film described in U.S. Pat. No. 5,840,407 issued Nov. 24, 1998, the content whereof is hereby incorporated herein by reference). Tapes including a length of the type of optical film disclosed in U.S. Pat. No. 5,840,407 and a layer of pressure sensitive adhesive along one major surface are commercially available as 3M™ Accentrim™ Tape, series B200 (V-groove tape) and series B100 (edge bevel tape), from 3M Company, St. Paul, Minn. Pieces of such tapes or tapes including strips of the other decorative films described above could be manually cut to have appropriate lengths and end shapes and applied manually to the adhesive on the layer of pre-mask material to form the graphic portions 124 and 126, but preferably are cut to appropriate lengths and end shapes and applied to the adhesive on the layer of pre-mask material by a tape applicator 10 of the type that is described in U.S. patent application Ser. No. 09/759,795 filed Jan. 12, 2001, using the method described in U.S. patent application Ser. No. 6,571,849, filed concurrently herewith, our file No. 56165US008, the contents of which two patent applications are hereby incorporated herein by reference. The graphic portions 124 and 126 are essentially identical, and the graphic portions 124 and 126 in the laminates 121 and 122 are adapted to be adhered to a substrate in a predetermined relative orientation to form a graphic having a predetermined shape generally by the method described above with reference to the assemblage of laminates 10. The cover sheet 130 included in the first laminate 121 has a first irregular visually distinctive mating edge 134 and the cover sheet 132 included in the second laminate 122 has a first irregular visually distinctive mating edge 135. The graphic portions 124 and 126 are adapted to be adhered to the substrate while the cover sheets 130 and 132 are adhered to them with the first irregular mating edge 134 of the cover sheet 130 in edge-to-edge engagement with the first irregular mating edge 135 of the cover sheet 132, after which the cover sheets 130 and 132 are removed, leaving on the substrate the graphic portions 124 and 126 that form the graphic having the predetermined shape.

The present invention has now been described with reference to several embodiments and possible modifications thereof. It will be apparent to those skilled in the art that many changes can be made in the embodiments described without departing from the scope of the present invention. For example, a useful graphic could be formed from a different number of graphic portions such as 2, 3, 5, or more (e.g., a useful graphic would be formed by using only the two laminates 12 described above). Thus, the scope of the present invention should not be limited to the structure described in this application, but only by the structures described by the language of the claims and the equivalents thereof.

What is claimed is:

1. An assemblage of at least three laminates, each of said laminates including a graphic portion having first and second opposite ends spaced in a first direction along the graphic part, front and rear major surfaces, and a peripheral edge, a layer of pressure-sensitive adhesive along the rear surface of the graphic portion, a separate polymeric cover sheet having opposite outer and inner major surfaces and overlaying the graphic portion, and a layer of removable pressure-sensitive adhesive having opposite front and rear major surfaces, said layer of removable pressure-sensitive adhesive being coextensive with and having its rear surface firmly adhered to the inner major surface of the cover sheet and having its front surface removably adhered to the front surface of the graphic portion;

said cover sheets each having a first irregular visually distinctive mating edge adjacent the first end of the graphic portion adhered to the cover sheet, and at least one of said cover sheets having a second irregular visually distinctive mating edge adjacent the second end of the graphic portion adhered to said one of said cover sheets, the mating edges of said cover sheets being engageable edge-to-edge only in predetermined relative orientations of said graphic portions that form with the graphic portions a graphic having a predetermined shape;

said graphic portions having parts extending past each other in said first direction when said graphic portions are in said predetermined relative orientations; and said mating edges on said cover sheets extend at least 0.05 inch or 0.13 cm past the adjacent peripheral edges of said graphic portions to protect the graphic portions and provide a predetermined spacing between said graphic portions when said mating edges of said cover sheets are in said edge-to-edge engagement;

so that with said mating edges on said cover sheets in engagement said graphic portions in one of said predetermined relative orientations can be adhered to a substrate by the layers of pressure sensitive adhesive on the graphic portions to form said graphic on the substrate.

2. An assemblage according to claim 1 wherein said assemblage includes at least four of said laminates including graphic portions, said four graphic portions include a pair of central graphic portions with said first ends of said central graphic portions being adjacent when said graphic portions are in said predetermined relative orientations, and further include a pair of end graphic portions having said first ends adjacent the second ends of the central graphic portions when said graphic portions are in said predetermined relative orientations; and said first irregular visually distinctive mating edges of said cover sheets of said laminates including said central graphic portions are engageable edge to edge with each other, said opposite second irregular visually distinctive mating edge of one of said cover sheets of said laminates including said central graphic portions will not engage with the first irregular visually distinctive mating edge of the cover sheet of the other of the central graphic portions, and said first visually distinctive mating edges of the cover sheets of said laminates including said end graphic portions are engageable edge to edge with the second irregular mating edges of either of said cover sheets adhered to said central graphic portions and will not engage with the first irregular visually distinctive mating edges of the cover sheets of the central graphic portions, said first irregular visually distinctive mating edges of said cover sheets of said laminates including said central graphic portions being different than and easily visually distinguishable from the second irregular mating edges of said cover sheets of said laminates including said central graphic portions and being different than and easily visually distinguishable from said first irregular mating edges of said cover sheets of said laminates including said end graphic portions.

3. An assemblage according to claim 2 wherein said graphic portions are elongate and have a combined length of over 6 feet or 1.8 meters when said graphic portions are in engagement in one of said predetermined relative orientations.

4. An assemblage according to claim 2 wherein said central graphic portions are essentially identical, and said end graphic portions are essentially identical.

5. An assemblage according to claim 1 wherein said mating edges on said cover sheets extend at least 0.1 inch or 0:25 cm past the adjacent peripheral edge of the graphic portions.

6. An assemblage according to claim 1 wherein said graphic portions are elongate in said first direction, said three graphic portions are essentially identical, and the first ends of two of said graphic portions are positioned adjacent the second ends of two of said graphic portions in said predetermined relative orientations of said graphic portions; and said cover sheets of said laminates including said graphic portions are essentially identical, each cover sheet having a second irregular visually distinctive mating edge adjacent the second end of the graphic portion adhered to the cover sheet, said second mating edge of one of said cover sheets being engageable edge-to-edge with the first irregular visually distinctive mating edges of either of the other two cover sheets to place said graphic portions in said predetermined relative orientations.

7. An assemblage according to claim 1 wherein said three graphic portions include a central graphic portion having said opposite ends and a pair of essentially identical end graphic portions each having said first end positioned at a different one of the opposite ends of the central graphic portion when said graphic portions are in said predetermined relative orientations; and said cover sheet of the laminate including said central graphic portion has said first and second irregular visually distinctive mating edges adjacent said ends of said central graphic portion, and said cover sheets of the laminates including said pair of end graphic portions have said first irregular visually distinctive mating edges adjacent said first ends of said end graphic portions that are engageable edge-to-edge with the first and second irregular mating edges of said cover sheet adhered to said central graphic portion to place said graphic portions in said predetermined relative orientations.

8. An assemblage according to claim 1 wherein said three graphic portions include a central graphic portion and two mirror image end graphic portions each having said first end positioned at a different one of the opposite first and second ends of the central graphic portion when said graphic portions are in said predetermined relative orientation; and said cover sheet of the laminate including said central graphic portion has said first and second irregular visually distinctive mating edges adjacent said ends of said central graphic portion, and said cover sheets of the laminates including said mirror image end graphic portions have said first irregular visually distinctive mating edges adjacent said first ends of said end graphic portions that are engageable edge-to-edge with the opposite irregular mating edges of said cover sheet adhered to said central graphic portion to place said graphic portions in only one predetermined relative orientation.

9. An assemblage according to claim 1 wherein said graphic portions each include a plurality of die cut parts.

10. An assemblage according to claim 1 wherein said graphic portions each include a plurality of elongate strips having parallel elongate edges.

11. An assemblage according to claim 1 wherein said graphic portions are elongate and have a combined length of over 6 feet or 1.8 meters when said graphic portions are in one of said predetermined relative orientations.

12. An assemblage of at least three laminates, each of said laminates including a graphic portion having first and second ends along the graphic part, front and rear major surfaces, and a peripheral edge, a layer of pressure-sensitive adhesive along the rear surface of the graphic portion, a separate polymeric cover sheet having opposite outer and inner major surfaces and overlaying the graphic portion, and a layer of removable pressure-sensitive adhesive having opposite front and rear major surfaces, said layer of removable pressure-sensitive adhesive being coextensive with and having its rear surface firmly adhered to the inner major surface of the cover sheet and having its front surface removably adhered to the front surface of the graphic portion;

said cover sheets each having a first irregular visually distinctive mating edge adjacent the first end of the graphic portion adhered to the cover sheet, and at least one of said cover sheets having a second irregular visually distinctive mating edge adjacent the second end of the graphic portion adhered to said one of said cover sheets, the mating edges of said cover sheets being engageable edge-to-edge only in predetermined relative orientations of said graphic portions that form with the graphic portions a graphic having a predetermined shape;

said mating edges on said cover sheets extend at least 0.05 inch or 0.13 cm past the adjacent peripheral edges of said graphic portions to protect the graphic portions and provide a predetermined spacing between said graphic portions when said mating edges of said cover sheets are in said edge-to-edge engagement;

said three graphic portions include a central graphic portion having said ends disposed generally at a right angle with respect to each other and a pair of essentially identical end graphic portions each having said first end positioned at a different one of the ends of the central graphic portion and projecting away from the central graphic portion at generally a right angle with respect to the other graphic portion when said graphic portions are in said predetermined relative orientations; and said cover sheet of the laminate including said central graphic portion has said first and second irregular visually distinctive mating edges adjacent said ends of said central graphic portion, and said cover sheets of the laminates including said pair of end graphic portions have said first irregular visually distinctive mating edges adjacent said first ends of said end graphic portions that are engageable edge-to-edge with the first and second irregular mating edges of said cover sheet adhered to said central graphic portion to place said graphic portions in said predetermined relative orientations;

so that with said mating edges on said cover sheets in engagement said graphic portions in one of said predetermined relative orientations can be adhered to a substrate by the layers of pressure sensitive adhesive on the graphic portions to form said graphic on the substrate.

13. An assemblage of at least four laminates, each of said laminates including a graphic portion having first and second opposite ends spaced in a first direction along the graphic part, front and rear major surfaces, and a peripheral edge, a layer of pressure-sensitive adhesive along the rear surface of the graphic portion, a separate polymeric cover sheet having opposite outer and inner major surfaces and overlaying the graphic portion, and a layer of removable pressure-sensitive adhesive having opposite front and rear major surfaces, said layer of removable pressure-sensitive adhesive being coextensive with and having its rear surface firmly adhered to the inner major surface of the cover sheet and having its front surface removably adhered to the front surface of the graphic portion;

said cover sheets each having a first irregular visually distinctive mating edge adjacent the first end of the graphic portion adhered to the cover sheet, and at least two of said cover sheets having a second irregular visually distinctive mating edge adjacent the second end of the graphic portion adhered to said one of said cover sheets, the mating edges of said cover sheets being engageable edge-to-edge only in predetermined relative orientations of said graphic portions that with the graphic portions form a graphic having a predetermined shape;

said mating edges on said cover sheets extend at least 0.05 inch or 0.13 cm past the adjacent peripheral edges of said graphic portions to protect the graphic portions and provide a predetermined spacing between said graphic portions when said mating edges of said cover sheets are in said edge-to-edge engagement;

said four graphic portions include a pair of central graphic portions with said first ends of said central graphic portions being adjacent when said graphic portions are in said predetermined relative orientations, and further include a pair of end graphic portions having said first ends adjacent the second ends of the central graphic portions when said graphic portions are in said predetermined relative orientations; and said first irregular visually distinctive mating edges of said cover sheets of said laminates including said central graphic portions are engageable edge to edge with each other, and said opposite second irregular visually distinctive mating edge of one of said cover sheets of said laminates including said central graphic portions will not engage with the first irregular visually distinctive mating edge of the cover sheet of the other of the central graphic portions, and said first visually distinctive mating edges of the cover sheets of said laminates including said end graphic portions are engageable edge to edge with the second irregular mating edges of either of said cover sheets adhered to said central graphic portions and will not engage with the first irregular visually distinctive mating edges of the cover sheets of the central graphic portions, said first irregular visually distinctive mating edges of said cover sheets of said laminates including said central graphic portions being different than and easily visually distinguishable from the second irregular mating edges of said cover sheets of said laminates including said central graphic portions and from said first irregular mating edges of said cover sheets of said laminates including said end graphic portions;

so that with said mating edges on said cover sheets in engagement said graphic portions in one of said predetermined relative orientations can be adhered to a substrate by the layers of pressure sensitive adhesive on the graphic portions to form said graphic on the substrate.

14. An assemblage according to claim 13 wherein said graphic portions are elongate in said first direction and have a combined length of over 6 feet or 1.8 meters when said graphic portions are in one of said predetermined orientations.

15. An assemblage according to claim 13 wherein said central graphic portions are essentially identical, and said end graphic portions are essentially identical.

* * * * *

UNITED STATES PATENT AND TRADEMARK OFFICE
CERTIFICATE OF CORRECTION

PATENT NO. : 6,811,848 B2
DATED : November 2, 2004
INVENTOR(S) : Pitzen, James F.

It is certified that error appears in the above-identified patent and that said Letters Patent is hereby corrected as shown below:

Column 2,
Line 49, after "(e.g., homeowners)" insert -- . --

Column 4,
Line 63, delete "DRAWING" and insert -- DRAWINGS --

Column 5,
Line 3, after "substrate" delete "," and insert -- ; --

Column 11,
Lines 63-67, delete "U.S. patent application Ser. No. 09/759,795 filed Jan. 12, 2001, using the method described in U.S. patent application Ser. No. 6,571,849, filed concurrently herewith, our file No. 56165US008, the contents of which two patent applications" and insert -- U.S. Patent No. 6,571,849, using the method described in U.S. Patent No. 6,773,537, the contents of which --

Column 12,
Line 59, delete "predetennined" and insert -- predetermined --

Column 13,
Line 57, delete "0:25 cm" and insert -- 0.25 cm --

Signed and Sealed this

Nineteenth Day of April, 2005

JON W. DUDAS
*Director of the United States Patent and Trademark Office*